United States Patent
Pearce (10) Patent No.: US 10,124,847 B2
(45) Date of Patent: Nov. 13, 2018

(54) BICYCLE SAFETY EXCLUSION ZONE SYSTEMS

(71) Applicant: Ford Global Technologies LLC, Dearborn, MI (US)

(72) Inventor: Anthony Pearce, Newport (AU)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/683,612

(22) Filed: Aug. 22, 2017

(65) Prior Publication Data

US 2018/0079463 A1    Mar. 22, 2018

(30) Foreign Application Priority Data

Sep. 20, 2016    (CN) .......................... 2016 1 0835493

(51) Int. Cl.
*B62J 6/00* (2006.01)
*B62J 3/00* (2006.01)
(Continued)

(52) U.S. Cl.
CPC .............. *B62J 6/00* (2013.01); *B60Q 1/0023* (2013.01); *B60Q 1/2603* (2013.01); *B60Q 1/30* (2013.01); *B60Q 1/50* (2013.01); *B60Q 1/525* (2013.01); *B60Q 5/005* (2013.01); *B60Q 9/008* (2013.01); *B62J 3/00* (2013.01); *B62J 27/00* (2013.01); *B60Q 2400/50* (2013.01);
(Continued)

(58) Field of Classification Search
CPC ...... B60Q 1/0023; B60Q 1/2603; B60Q 1/30; B60Q 1/50; B60Q 1/525; B60Q 2400/50; B60Q 5/005; B60Q 9/008; B62J 2099/002; B62J 2099/004; B62J 2099/008; B62J 27/00; B62J 3/00; B62J 6/00
See application file for complete search history.

(56) References Cited

U.S. PATENT DOCUMENTS 8,325,027 B2    12/2012  Tee et al.
2013/0127638 A1*  5/2013  Harrison ................ G08G 1/166
                                                340/903

(Continued)

FOREIGN PATENT DOCUMENTS

GB    2497911 A     6/2013
WO    2011137477 A1  11/2011
WO    2014204525 A2  12/2014

*Primary Examiner* — Sisay Yacob
(74) *Attorney, Agent, or Firm* — Jennifer Stec; Mohr IP Law Solutions, PC (57) ABSTRACT

Bicycle safety exclusion zone systems capable of being attached to a bicycle, comprised of one or more projector-sensor devices and a processing unit. Each projector-sensor device is capable of detecting vehicles in proximity of the bicycle and of projecting at least a portion of a visual safety exclusion zone upon ground surrounding the bicycle. The processing unit is in communication with the one or more projector-sensor devices. When one of the projector-sensor devices detects a vehicle in proximity to the bicycle, the processing unit generates an alert detectable by a user of the bicycle, and the one or more projector-sensor devices change the visual appearance of the visual safety exclusion zone. In some embodiments, the change in the visual appearance of the safety exclusion zone comprises a change of color.

18 Claims, 4 Drawing Sheets

(51) Int. Cl.
*B60Q 1/52* (2006.01)
*B60Q 1/30* (2006.01)
*B62J 27/00* (2006.01)
*B60Q 1/00* (2006.01)
*B60Q 1/26* (2006.01)
*B60Q 1/50* (2006.01)
*B60Q 5/00* (2006.01)
*B60Q 9/00* (2006.01)
*F21W 107/13* (2018.01)
*B62J 99/00* (2009.01)

(52) U.S. Cl.
CPC .... *B62J 2099/002* (2013.01); *B62J 2099/004* (2013.01); *B62J 2099/008* (2013.01); *F21W 2107/13* (2018.01)

(56) References Cited

U.S. PATENT DOCUMENTS

| | | | |
|---|---|---|---|
| 2013/0148375 A1* | 6/2013 | Connor | B62J 6/16 362/554 |
| 2016/0023703 A1 | 1/2016 | Braggin | |
| 2016/0144915 A1* | 5/2016 | Bejestan | B62J 99/00 340/432 |

* cited by examiner

BICYCLE SAFETY EXCLUSION ZONE SYSTEMS

RELATED APPLICATION

This application claims the benefit of Chinese Patent Application No.: CN 201610835493.X filed on Sep. 20, 2016, the entire contents thereof being incorporated herein by reference.

FIELD

The present disclosure relates generally to systems for improving bicycle safety, in particular, safety systems for bicycles that project a visual exclusion zone around the bicycle, and modify the visual appearance of the exclusion zone as well as notify the cyclist upon a vehicle breaching the exclusion zone are described.

BACKGROUND

When navigating roads that are shared with other vehicles such as cars and trucks, safety is of paramount concern. Pedestrians typically travel against the flow of traffic so as to see and avoid oncoming traffic. In most localities, however, bicycles are required to not only share the road with vehicles, but are also treated as vehicles themselves, and are required to travel with the existing traffic flow. Despite this, bicycles commonly travel at speeds much slower than motorized vehicles, and so can present obstacles to motorists. As a result, it is common for bicycles to be passed by cars while on the road, and unless the cyclist has a rear view mirror and/or astute hearing, the cyclist may not be aware of the vehicle's presence until the vehicle is upon the cyclist. Likewise, the vehicle driver, depending upon their speed and ambient lighting conditions, may have difficulty seeing an upcoming bicycle until almost upon the bicycle, with minimal time to avoid a collision. Because bicycles have substantially less mass than even a small motor vehicle, and the cyclist has minimal impact protection, a cyclist's safety while in the presence of other, faster motor vehicles can be imperiled. Devices that can help improve a cyclist's situational awareness and improve visibility to other vehicles can offer improved safety to cyclists.

Known bicycle safety systems are not entirely satisfactory for the range of applications in which they are employed. For example, existing systems, such as a mirror or series of mirrors, rely upon the cyclist to maintain situational awareness, and do not improve visibility of the bicycle for oncoming vehicles. Some vehicles include detection mechanisms that alert drivers to the presence of bicycles and other obstructions that the vehicle is approaching. However, such systems are not universal, and so protect cyclists only from vehicles equipped with such detection systems. Older and/or less sophisticated vehicles that lack detection systems still pose a risk to cyclists. Still other systems may provide a visual cue of a zone for a bicycle, to give a driver some measure of how much distance to keep their vehicle from a bicycle. Such systems may not provide active detection of approaching vehicles, and for an inattentive driver, such systems may not actively and effectively inform the driver of when they have approached too close to the bicycle and into the bicycle zone, thus posing an increasing risk to the cyclist.

U.K. Patent Application No. GB 2497911 A is directed to a bicycle safety device that includes a vehicle detection means, projection means for projecting a boundary line around the bicycle onto the road surface, and an alert means to alert the motor vehicle driver and cyclist of the vehicle presence. The projected boundary line can be static, or can consist of changing lights. The alert means contemplated includes a horn or audio warning to the vehicle driver to alert them of the presence of the bicycle. However, audio alerts may not always be effective, as a vehicle driver may have deficient hearing, the vehicle may be too well soundproofed, or the driver may have music turned up too loud to clearly hear the audio alert.

PCT Application No. WO 2011/137477 A1 is directed to a cyclist proximity warning system that includes a transmitter on the bicycle, and a corresponding receiver in the vehicle. Once the bicycle gets within a predetermined range of the vehicle, the receiver in the vehicle alerts the driver to the presence of the bicycle.

United States Patent Application No. US 2016/0023703 A1 is directed to a safety device for alerting motor vehicle drivers of a proximity of a bicyclist, and includes a device that mounts to a bicycle and provides one or more lights that are visible to approaching vehicles. The safety device may additionally project lights upon ground proximate to the bicycle.

U.S. Pat. No. 8,325,027 is directed to a safety light apparatus that projects light images resembling the boundaries of a bike lane. The apparatus can be mounted on the seat tube of a bicycle, and projects the lane lines to either side of and trailing behind the bicycle. A stabilizer can reduce movements of the projected lane boundaries. The apparatus may also project a bike lane icon behind the bicycle within the projected lane lines.

PCT Application No. WO 2014/204525 A3 is directed to methods and systems for cyclist monitoring and crash prevention. The application discloses using a sensor to create a virtual smart lane around bicycle. The sensor also is capable of detecting approaching objects and alerting the bicycle rider.

Thus, there exists a need for bicycle safety systems that improve upon and advance the design of known bicycle safety systems. Examples of new and useful bicycle safety systems relevant to the needs existing in the field are discussed below.

SUMMARY

The present disclosure is directed to a bicycle safety exclusion zone system.

According to one aspect, the system is capable of being attached to a bicycle, and is comprised of one or more projector-sensor devices. Each projector-sensor device is capable of detecting vehicles in proximity of the bicycle and of projecting at least a portion of a visual safety exclusion zone upon ground surrounding the bicycle. A processing unit is in communication with the one or more projector-sensor devices. When one of the projector-sensor devices detects a vehicle in proximity to the bicycle, the processing unit generates an alert detectable by a user of the bicycle, and the one or more projector-sensor devices change the visual appearance of the visual safety exclusion zone.

In one embodiment, the one or more project-sensor devices are mounted at ends of a handlebar, at a rear of a seat, or a rear of a seat stem.

In another one embodiment, the visual safety exclusion zone is defined by a continuous line or a dashed line that encircles the bicycle.

In another embodiment, the one or more projector-sensor devices change the visual appearance of the visual safety exclusion zone by changing the color of the line or changing the pattern of the zone projected upon the ground.

In another embodiment, the projector-sensor devices change the visual appearance of the visual safety exclusion zone when the detected vehicle crosses into the line or touches the line of the visual safety exclusion zone.

In another embodiment, the alert generated by the processing unit is aural or visual.

In another embodiment, the bicycle safety exclusion zone system further comprises a sensor to detect a speed of the vehicle, wherein a scope of the bicycle safety exclusion zone varies with a detected speed.

In another embodiment, the projector-sensor devices include a bulb projector, one or more LED lights, or a laser projector to project a line or a pattern that defines the safety exclusion zone.

In another embodiment, the projector-sensor devices include at least one of a camera or a radar to detect vehicles in proximity to the bicycle by using a camera or a radar.

According to another aspect, the bicycle safety exclusion zone system comprises a processing unit, at least one sensor in communication with the processing unit, and at least one projector in communication with the processing unit. The programming unit, at least one sensor, and at least one projector are all mounted to a bicycle. The processing unit instructs the at least one projector to generate and project a visual safety exclusion zone upon ground surrounding the bicycle, and further instructs the at least one projector to modify the appearance of the visual safety exclusion zone upon the at least one sensor detecting that a vehicle has crossed into the visual safety exclusion zone.

In yet another embodiment, the processing unit further provides an alert to a user of the bicycle upon the at least one sensor detecting that a vehicle has crossed into the visual safety exclusion zone.

In still another embodiment, the appearance of the visual safety exclusion zone is modified by altering the color of the zone or generating a flash pattern of a line defining the safety exclusion zone.

In another embodiment, the at least one projector is a light projector to generate and project light to define the visual safety exclusion zone.

In another embodiment, the bicycle safety exclusion zone system further comprises a lane detection device to distinguish the vehicle from a parked vehicle or an object on one side of a path that the bicycle is travelling and the alert to a bicycle rider is provided only when the vehicle is detected.

In still another embodiment, the bicycle safety exclusion zone system further comprises a user interface for the user to select an alert option, wherein the alert option includes an alert for a vehicle approaching from the left, an alert for a vehicle approaching from the right, or an alert for a vehicle approaching from either left or right directions.

In a further embodiment, the processing unit is further configured to instinct the projector to project an indication signal recognized by a camera system of an autonomous vehicle to assist the autonomous vehicle to detect the bicycle and calculate an appropriate path around the bicycle.

In still a further embodiment, the indication signal is a red line that defines the bicycle safety exclusion zone or a flashing light pattern on the ground at a location capable of being captured by the camera of the autonomous vehicle when the vehicle approaches the bicycle at a specific distance.

According to still another aspect of the invention, the bicycle safety exclusion zone system is mounted onto a bicycle, and comprises a plurality of projector-sensor devices and a processing unit. Each of the plurality of projector-sensor devices is capable of projecting at least a portion of a visual safety exclusion zone upon ground surrounding the bicycle and of detecting a vehicle approaching the bicycle. The processing unit is in communication with the plurality of projector-sensor devices, and upon detection of a vehicle by one of the projector-sensor devices, emits a warning to a rider of the bicycle and signals each of the plurality of projector-sensor devices to change the color of the visual safety exclusion zone.

In one embodiment, each of the plurality of projector-sensor devices uses one or more lasers to project its portion of a visual safety exclusion zone.

In a further embodiment, the processing unit is in data communication with a smartphone, and issues warnings via the smartphone.

DETAILED DESCRIPTION

The disclosed bicycle safety exclusion zone systems will become better understood through review of the following detailed description in conjunction with the figures. The detailed description and figures provide merely examples of the various inventions described herein. Those skilled in the art will understand that the disclosed examples may be varied, modified, and altered without departing from the scope of the inventions described herein. Many, variations are contemplated for different applications and design considerations; however, for the sake of brevity, each and every contemplated variation is not individually described in the following detailed description.

Throughout the following detailed description, examples of various bicycle safety exclusion zone systems are provided. Related features in the examples may be identical, similar, or dissimilar in different examples. For the sake of brevity, related features will not be redundantly explained in each example. Instead, the use of related feature names will cue the reader that the feature with a related feature name may be similar to the related feature in an example explained previously. Features specific to a given example will be described in that particular example. The reader should understand that a given feature need not be the same or similar to the specific portrayal of a related feature in any given figure or example.

With reference to FIGS. 1-3B, an example of a bicycle safety exclusion zone system 100, safety system 100, will now be described. Safety system 100 functions to detect approaching vehicles, project a visual safety exclusion zone that surrounds the bicycle upon which it is mounted, and provide a visual cue if a vehicle transgresses into the safety exclusion zone, in addition to alerting the cyclist of the vehicle's presence. The reader will appreciate from the figures and description below that safety system 100 addresses shortcomings of conventional bicycle safety systems.

For example, by providing a visual cue to an approaching vehicle's driver of an exclusion zone violation, safety system 100 can alert a driver of a bicycle's presence without concern that the driver is unable to hear an aural alert, or has misjudged their distance from the bicycle. So long as the vehicle's driver is looking out their windshield, they will be alerted to a violation of the safety exclusion zone, and thereby be made aware that they are too close to the bicycle. By providing an alert to the cyclist, both from a visual change of the safety exclusion zone projection as well as a possible aural signal or a visual signal which is displayed in a user interface 109 (shown in FIG. 4) in front of the bicycle for example, the cyclist's safety need not rely upon the cyclist having ongoing situational awareness. Further, safety system 100 is completely self-contained upon the bicycle, and requires no equipment on approaching vehicles. Thus, safety system 100 provides active protection to cyclists from all vehicles, regardless of age, make, or capability.

As safety system 100 projects a visual warning when a safety zone is breached that can be seen by anyone located nearby, safety system 100 provides something of a social reinforcement to enhance the cyclist's safety, as the driver of the breaching vehicle may have a degree of embarrassment by the visual signaling that they have approached too close to the cyclist. Furthermore, the visual appearance of the exclusion zone projected by safety system 100 may also be picked up by autonomous vehicles that use machine vision to assist in navigation, and allow such autonomous vehicles to compute an appropriate path around the cyclist. In some implementations, the appearance of the exclusion zone may be specifically designed to be recognized by an autonomous vehicle to further aid detection and computation of a safe path around the bicycle.

Safety system 100 is capable of being attached to a bicycle 102, and includes one or more projector-sensor devices 104. One or more projector-sensor devices 104 are configured to detect vehicles in the proximity of bicycle 102 and to project a visual safety exclusion zone 106 upon the ground surrounding bicycle 102. A processing unit 108 is in communication with one or more projector-sensor devices 104, and upon one of the projector-sensor devices 104 detecting a vehicle in proximity to bicycle 102, processing unit 108 generates an alert detectable by a user of bicycle 102. Additionally, processing unit 108 directs one or more projector-sensor devices 104 change the visual appearance of visual safety exclusion zone 106.

Figure 1:
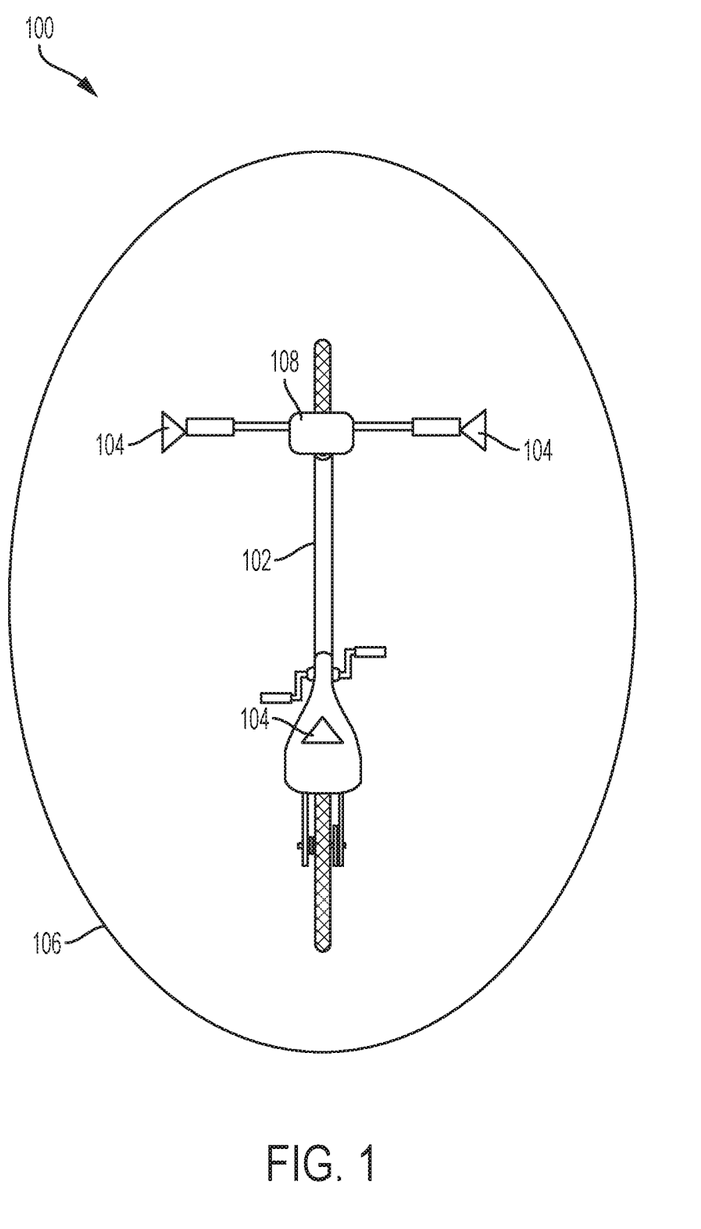
FIG. 1 is an overhead diagram view of an example a bicycle safety exclusion zone system.

As can be seen in FIG. 1, bicycle 102 is preferably any standard bicycle, configured with a handlebar and saddle. In addition to bicycles, bicycle 102 could be implemented as other types of vehicles, such as tricycles, tandem bicycles, quadricycles or other four-wheeled vehicles such as pedal-powered passenger trams that seat multiple people. Furthermore, bicycle 102 may include motorized vehicles, such as mopeds, scooters, motorcycles, all-terrain vehicles, and the like. Safety system 100 can either be implemented into bicycle 102 at the time of manufacture, as an integrated system, or can be sold as an aftermarket add-on to be subsequently installed by a user of bicycle 102, or by a professional installer, depending upon the needs of the user and the type of bicycle 102.

Projector-sensor devices 104 are preferably attached to either side of bicycle 102's handlebars, or could be integrated into the handlebars. Alternatively or additionally, a projector-sensor device 104 could be placed under, behind or on the rear of bicycle 102's saddle or seat. Still further, projector-sensor device 104 could be mounted to the seat stem, the rear of the seat stem, behind the seat stem, or on a frame component or fender at the rear of bicycle 102. Where bicycle 102 is implemented as a vehicle that lacks a handlebar and/or saddle, projector-sensor devices 104 are preferably placed so as to provide coverage on both sides and the rear of bicycle 102. While FIG. 1 shows three projector-sensor devices 104, depending upon the configuration of bicycle 102 and the capabilities of projector-sensor devices 104, fewer or more projector-sensor devices 104 may be utilized. Furthermore, a projector-sensor device 104 may be placed on the front of bicycle 102 where vehicle detection capabilities are needed or desired ahead of bicycle 102.

Projector-sensor devices 104 combine light projection functionality along with vehicle detection functionality. Light projection functionality is preferably provided by one or more lasers, or via focused light projection that may be accomplished by LEDs, or any other suitable light-producing mechanism that offers acceptable power usage considering the power source for safety system 100. Where a laser is used, the laser s preferably a low-power solid state laser, such as a laser diode of Class IIIa or lower power, for safety reasons. In other words, projector-sensor device includes a bulb projector, one or more LED lights, or a laser projector.

Light projection functionality is used to create visual safety exclusion zone 106, which in the figures is depicted as an ovoid shape defined by light projected onto the ground surrounding bicycle 102. Visual safety exclusion zone 106 is typically projected in a single color, and may be projected as a solid or patterned line, such as in dashes, waves, zig-zags or other pattern or color intended to enhance and optimize visibility of visual safety exclusion zone 106. While depicted as an ovoid shape, it should be appreciated that a variety of shapes may be equally suitable, such as squares, polygons, or other suitable irregular shapes or areas. Furthermore, while depicted in the figures as a line, visual safety exclusion zone 106 could be implemented as an area, multiple lines, patterns of dots, shapes or symbols, or other similar visual devices. Visual safety exclusion zone 106 could be projected using a focused or diffuse light source, and may be monochromatic or multiple colors.

Visual safety exclusion zone 106 may be projected by a single projector-sensor device 104, or by a combination of multiple projector-sensor devices 104 on bicycle 102, with each projector-sensor device 104 projecting only a portion of visual safety exclusion zone 106. Where visual safety exclusion zone 106 is projected by multiple projector-sensor devices 104, the various projector-sensor devices 104 may require calibration with respect to each other to achieve a seamless and correctly projected visual safety exclusion zone 106.

The size of visual safety exclusion zone 106 may also be varied from either a preset size, or dynamically by safety system 100 as the cyclist rides bicycle 102. The size may vary due to factors such as rider experience, size of bicycle 102, the speed of approaching vehicles as detected by projector-sensor devices 104, and the speed of the bicycle 102. For example, where vehicles approach at high speed, visual safety exclusion zone 106 may be increased to provide a greater margin of safety to compensate for faster closure rates and corresponding less time for a vehicle driver to react to avoid bicycle 102. As the speed of bicycle 102 increases, the speed of approaching vehicles becomes relatively slower, and the size of vehicle safety exclusion zone 106 may be decreased. Likewise, an inexperienced rider may need a larger visual safety exclusion zone 106 to add an extra cushion of safety. Furthermore, changing light conditions may necessitate size variance; as outside light falls and bicycle 102 becomes more difficult to see, visual safety exclusion zone 106 may be enlarged to provide a greater safety cushion. Changing light conditions may also require changing the intensity of light emitted by projector-sensor devices 104, with brighter ambient conditions requiring an increase of light intensity to maintain visibility.

As mentioned above, projector-sensor devices 104 include mechanisms for detecting approaching vehicles. The detection technology may be any suitable means of detection that is currently known or later developed that is capable of registering the approach of a vehicle at potentially high speeds, and at a distance suitable to the potential speed of approaching vehicles. For example, where safety system 100 is used on bicycles that will be traveling on roads where vehicles will be traveling at high speeds, due to faster closure rates, the detectors in projector-sensor devices 104 must be capable of detection at a greater range than would be necessary on roads where vehicles travel at comparatively lower speeds, to enable safety system 100 to offer optical safety to a cyclist. Detection technology is preferably a camera, but could be implemented as range finding technology such as radar, lidar, laser ranging, microwave ranging, infrared, sonic, or any other suitable technology. Where a camera is used, image processing and analysis may be implemented. Furthermore, projector-sensor devices 104 may optionally be equipped with appropriate sensors that are configured to detect the speed of an approaching vehicle.

Although projector-sensor devices 104 are depicted each as unified devices that include both light projection and vehicle sensing, this functionality could be implemented using separate projector devices and sensor devices. In such an implementation, the number of vehicle sensors may differ from the number of light projectors. For example, such an implementation could use three vehicle sensors in the positions of projector-sensor devices 104 depicted in FIG. 1, with possibly a single light projector that generates the visual safety exclusion zone 106.

Also shown in FIG. 1 is processing unit 108, which is in communication with projector-sensor devices 104. Processing unit 108 receives input from projector-sensor devices 104 as they detect approaching vehicles, and can perform analysis of the input to determine whether a vehicle has transgressed into the visual safety exclusion zone 106. Such analysis may include image analysis where projector-sensor devices 104 use a camera for vehicle detection. Upon detection of a vehicle and determination that the vehicle is transgressing or about to transgress into visual safety exclusion zone 106, processing unit 108 can alert the cyclist by way of visual and/or aural warnings present on user interface 109 on processing unit 108, such as a tone, voice, flashing lights, annunciator, buzzer, or a combination of any of the foregoing, or other alert types that gain the cyclist's attention to the presence of the vehicle. Such warnings may also include haptic feedback through the handlebars and/or seat, such as a pulsating or vibration. Furthermore, upon detection, processing unit 108 directs projector-sensor devices 104 to modify the visual appearance of visual safety exclusion zone 106, so that the driver of the approaching vehicle is alerted to its proximity to bicycle 102 and can take corrective action. Still further, processing unit 108 may initially alert the cyclist aurally and/or visually to the approach of a vehicle but maintain the visual appearance of visual safety exclusion zone 106 until the vehicle actually touches or transgresses into the into the zone.

In addition, the size of visual safety exclusion zone 106 may optionally be varied, either increased or decreased in size, by processing unit 108 based upon analysis and/or detection of the speed of approaching vehicles. These parameters may be varied by using user interface 109 on processing unit 108. Other possible adjustable parameters include options to select the normal and warning colors and/or patterns of visual safety exclusion zone 106, the type of cyclist alert (e.g. aural, visual, and warning qualities), as well as to inform processing unit 108 of which side of the road a cyclist is using. When a cyclist rides along a road with parked cars along one side, projector-sensor devices 104 may generate spurious readings from parked cars in proximity to bicycle 102. Informing processing unit 108 of which side of the road the cyclist is using allows processing unit 108 to determine which projector-sensor devices 104 to screen for spurious detections, thereby reducing or potentially eliminating false alerts. For example, user interface 109 may allow the cyclist to select only alerts for vehicles approaching from the left, only for vehicles approaching from the right, or for vehicles approaching from both the left or right.

Alternatively, safety system 100 may additionally include one or more lane detection devices 150 (depicted in FIG. 4) configured to distinguish parked vehicles and other obstacles located adjacent to one side of the path bicycle 102 is traveling from approaching vehicles, and provide such information to processing unit 108 so as to minimize false alerts. Such lane detection devices 150 may be integrated into projector-sensor devices 104, or may be discreet separate devices. Lane detection devices 150 can be implemented using any technology suitable for detecting vehicles in proximity to bicycle 102, such as object detection, camera recognition, machine vision, or other detection technology such as radar, sonar, lidar, or other similar technologies. Moreover, lane detection devices 150 could be implemented to recognize the presence of road markings in concert with object detection or camera recognition to further distinguish parked vehicles and stationary objects from approaching vehicles. Still further, with appropriate programming lane detection devices 150 could enable processing unit 108 to automatically determine the position of bicycle 102 on the roadway, and automatically reject parked vehicles and other stationary objects without the need for the cyclist to inform safety system 100 of road position.

Processing unit 108 communicates with projector-sensor devices 104 either via wired or wireless links. Preferably, projector-sensor devices 104 communicate with each other and/or with processing unit 108 via a short-range wireless link such as Bluetooth, although any suitable technology could be employed. Furthermore, although depicted as a separate unit in the figures, processing unit 108 could be integrated into one or more projector-sensor devices 104. With such integration, safety system 100 could be implemented in a single physical unit, depending upon the needs and configuration of bicycle 102, where the single unit provides light projection, vehicle section, processing, and cyclist alerting. Processing unit 108 can be implemented using any suitable processing technology, such as embedded systems offered by Atmel, Intel, or ARM, and may run custom-developed or commercial off-the-shelf software and firmware solutions.

As mentioned above, processing unit 108 may include user interface 109. In addition or as an alternative to user interface 109, processing unit 108 may be configured to communicate with a cyclist's smartphone, either via web access or via a dedicated app. Where processing unit 108 is configured to communicate with the smartphone, the smartphone may be used as user interface 109 by the cyclist to configure similar parameters to those available via a user interface that is integrated with processing unit 108, e.g. configuring alerts, the appearance of visual safety exclusion zone 106, which side of the road the cyclist is using, etc. Additionally, the smartphone may be used in addition to, or in lieu of, alerts to the cyclist generated by processing unit 108. For example, user interface 109 includes the alert options including an alert for a left vehicle, an alert to a right vehicle or an alert to vehicle coming from both left and right directions. Proximity alerts may be transmitted to the cyclist's smartphone, allowing a cyclist to be notified of approaching traffic while the cyclist may be using the smartphone to enjoy music or track activities. The smartphone may also be mounted upon the handlebars of bicycle 102, thereby acting as the primary user interface for safety system 100.

Still further, where a cyclist is using a smartphone, the smartphone may be able to serve as processing unit 108, particularly when running a dedicated application. In such an embodiment, projector-sensor devices 104 would communicate with the smartphone directly via Bluetooth or other wireless link, and the smartphone would directly evaluate detections and command projector-sensor devices 104 to project the correct visual safety exclusion zone 106 depending upon whether a vehicle was detected.

Figure 2:
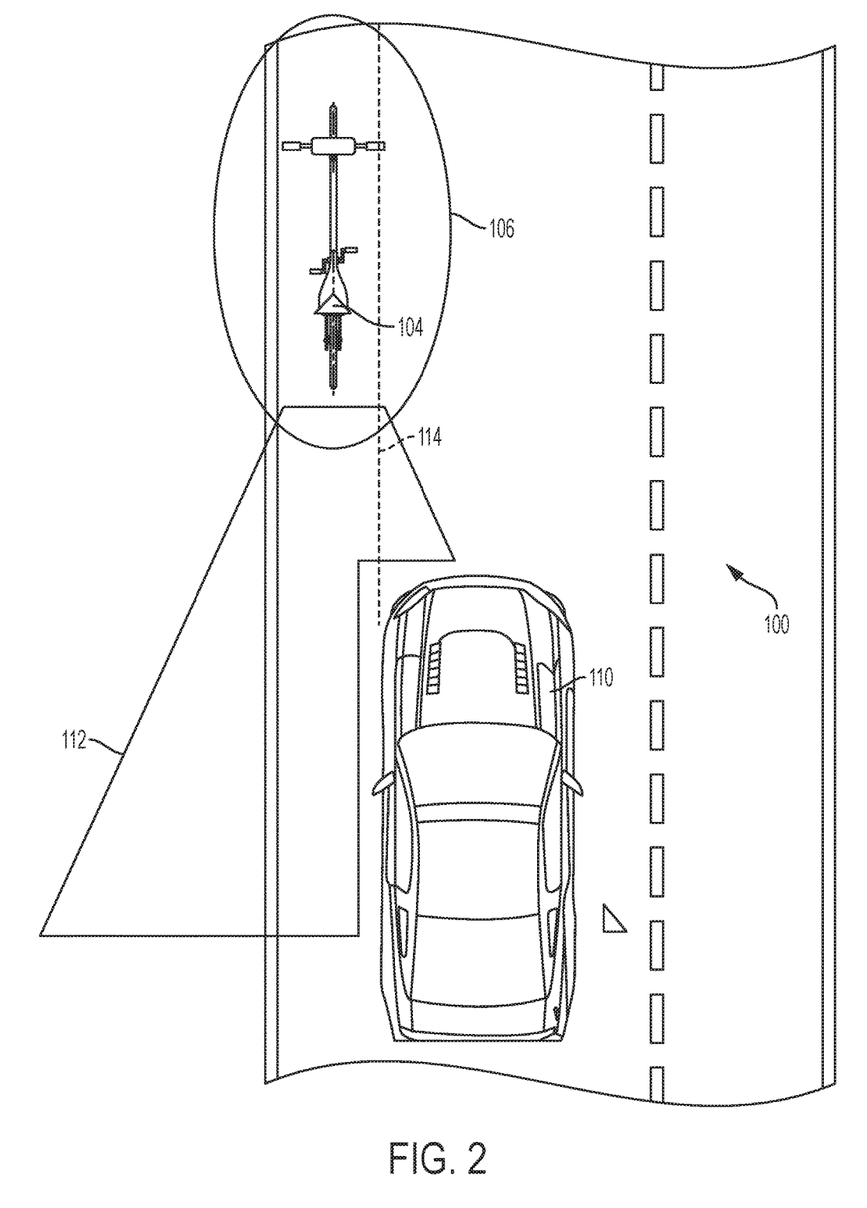
FIG. 2 is an overhead diagram view of the bicycle safety exclusion zone system shown in FIG. 1 depicting the system in use with an approaching vehicle overtaking the bicycle.

In the example shown in FIG. 2, a diagram of how safety system 100 interacts with a vehicle 110 is depicted. Projector-sensor device 104 mounted on bicycle 102 behind the saddle possesses a roughly triangular detection zone 112, the size and configuration of which is determined by the sensors implemented in projector-sensor device 104. As vehicle 110 approaches bicycle 102 and enters into detection zone 112, processing unit 108 is alerted and calculates a predicted vehicle trajectory 114. If the predicted vehicle trajectory 114 places vehicle within visual safety exclusion zone 106, processing unit 108 may instruct projector-sensor devices 104 to alter the visual appearance of visual safety exclusion zone 106 so as to alert the driver of the approaching vehicle 110. Alternatively, processing unit 108 may delay, alteration until vehicle 110 either touches, transgresses, or otherwise enters into visual safety exclusion zone 106, and/or cause the size of visual safety exclusion zone 106 to be altered depending upon the computed speed of vehicle 110.

In addition to changing the appearance of visual safety exclusion zone 106, upon detection of an approaching vehicle processing unit 108 may cause a message to be projected onto the ground or onto the vehicle, such as "Please drive safely", or other similar message. Where such functionality is implemented, either projector-sensors 104 can be equipped with functionality to project the message, or safety system 100 may be equipped with a separate projector 104a (seen in FIG. 4) dedicated to projecting the message. Furthermore, a user of safety system 100 may, via the user interface, be able to customize the projected message.

Figure 3A:
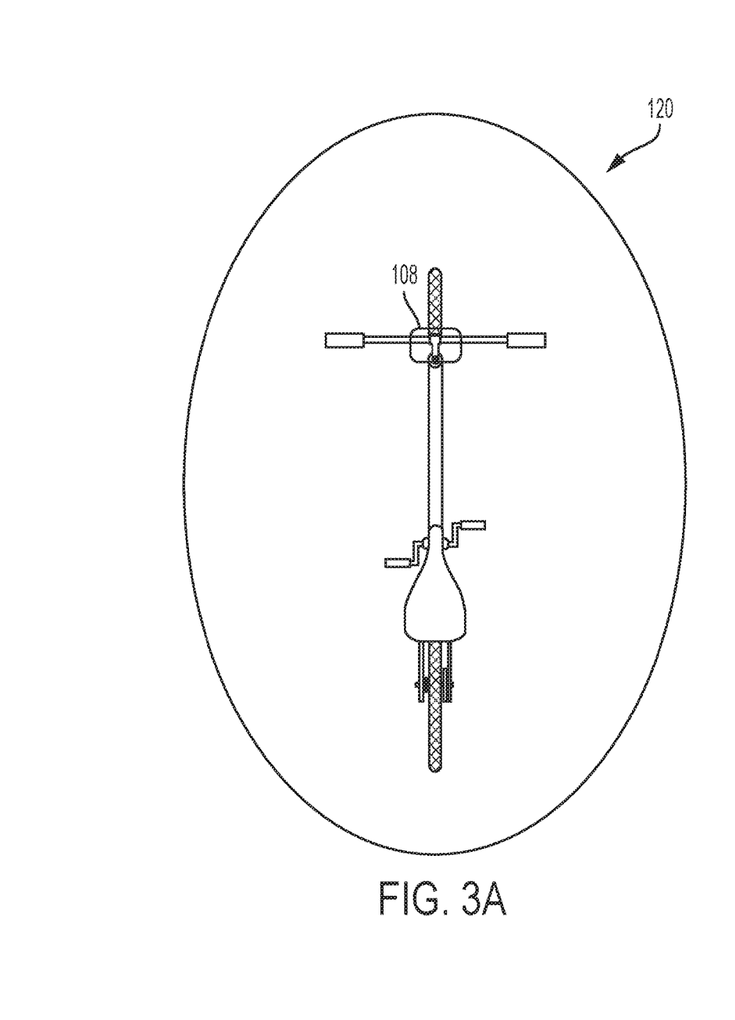
FIG. 3A is an overhead diagram view of the bicycle safety exclusion zone system shown in FIG. 1 depicting a visual safety exclusion zone when no vehicle has transgressed into the exclusion zone.
Figure 3B:
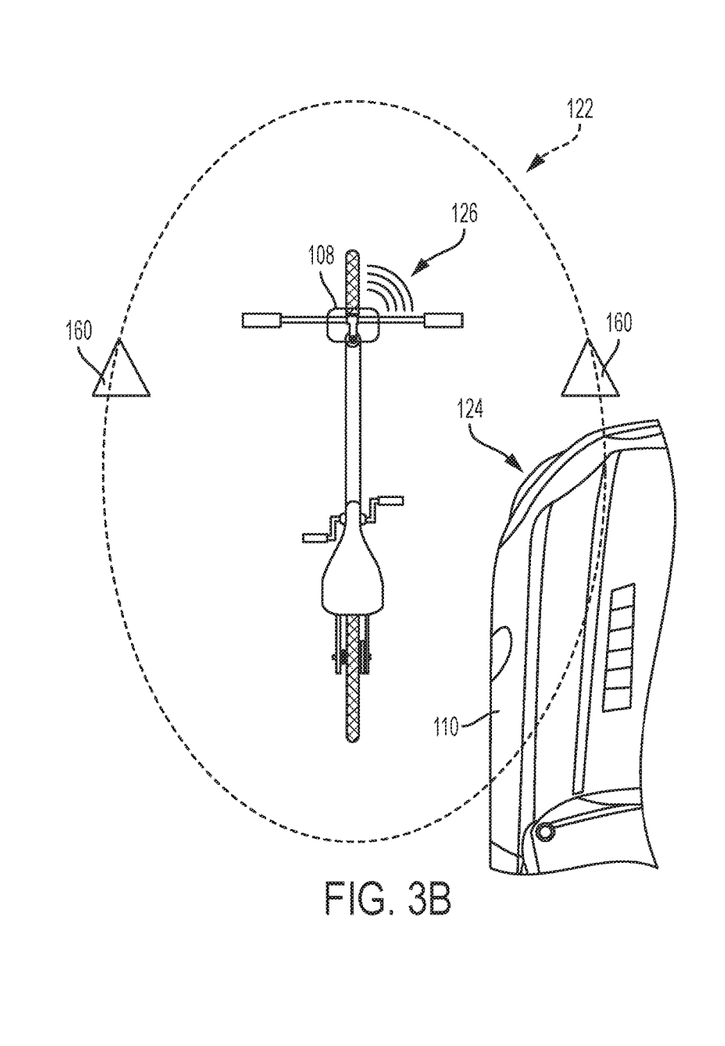
FIG. 3B is an overhead diagram view of the bicycle safety exclusion zone system shown in FIG. 1 depicting a visual safety exclusion zone when a vehicle has transgressed into the exclusion zone.

Turning to FIGS. 3A and 3B, examples of visual alteration of the appearance of visual safety exclusion zone 106 are depicted. In Fi visual safety exclusion zone 106 is shown in its normal configuration, exclusion zone projection 120, when a vehicle 110 is not detected to be approaching or transgressing visual safety exclusion zone 106. FIG. 3B shows vehicle 110 at position 124, within visual safety exclusion zone 106. As a result, processing unit 108 has both triggered an aural alert 126, and modified the appearance of visual safety exclusion zone 106 to exclusion zone projection 122, depicted as a dashed line. Other possible visual modifications could be employed, such as, a flashing line, changing to a zig-zag pattern, a crawl or chase pattern, or any other suitable pattern that is visually distinct from the normal appearance of exclusion zone projection 120 when the bicycle safety exclusion zone is not breached. Alternatively, visual modification may maintain a solid line, and instead alter the color of exclusion zone projection 122. For example, visual safety exclusion zone 106 may be a solid line in the color green for exclusion zone projection 120, and may be changed to a solid line in the color red for exclusion zone projection 122. Further, visual modification may alter both the shape as well as the color of visual safety exclusion zone 106. Still further, visual modification may be limited only to that portion of visual safety exclusion zone 106 that is actually transgressed by vehicle 110. In such an implementation, only that portion of visual safety exclusion zone 106 depicted in FIG. 3B as actually covering vehicle 110 at position 124 would be changed to exclusion zone projection 122, with the remainder staying as exclusion zone projection 120. To implement such functionality, projector-sensors 104 would need to additionally be able to distinguish vehicle 110 from the surrounding ground as it transgressed into vehicle safety, exclusion zone 106, and instruct the appropriate projector-sensor 104 to change only a portion of the projected exclusion zone. Alternatively or additionally, projector-sensor 104 and processing unit 108 could detect a change in the appearance of the portion of visual safety exclusion zone 106 caused by the intrusion of vehicle 110, and alter only the visual appearance of that portion with the detected change.

As described above, while the figures depict a line for visual safety exclusion zone 106 in both exclusion zone projections 120 and 122, exclusion zone projections 120 and 122 could be implemented using projected areas, shapes, symbols or patterns, using multiple colors, and/or using diffuse or focused light sources. Where multiple colors are employed for visual safety exclusion zone 106 along with a color change to signal transgression of the zone, exclusion zone projection 122 would alter one or more of the colors of visual safety exclusion zone 106.

Furthermore, although vehicle 110 is depicted at position 124 at the time of creation of exclusion zone projection 122, it should be understood that processing unit 108 may be set to trigger the visual modification from exclusion zone projection 120 to exclusion zone projection 122 prior to vehicle 110 crossing visual safety exclusion zone 106 if processing unit 108 projects that vehicle 110 will imminently transgress visual safety exclusion zone 106 in its predicted trajectory 114.

Figure 4:
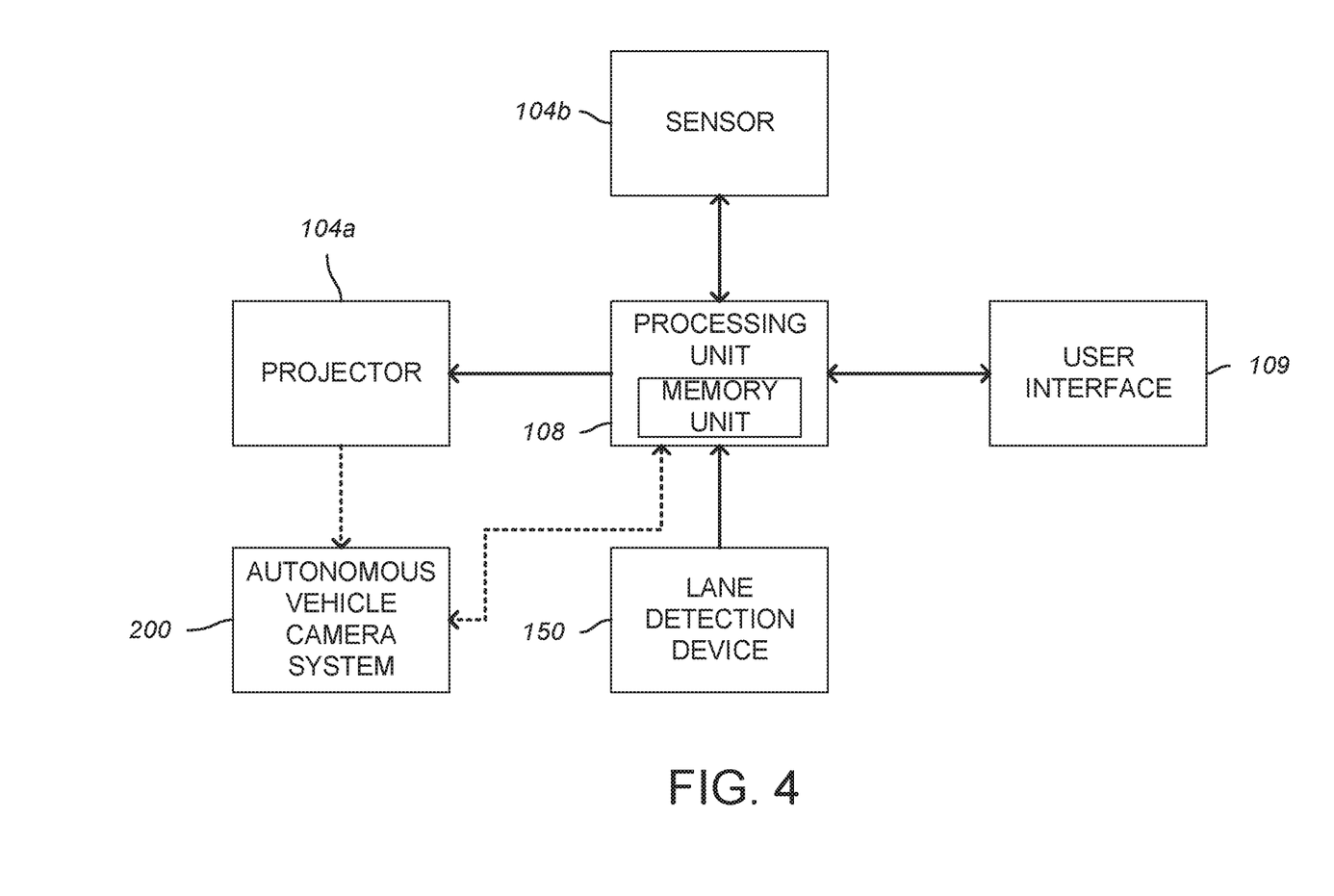
FIG. 4 is a block diagram of the various components of the bicycle safety exclusion zone system shown in FIG. 1, depicting how the system may interact with an autonomous vehicle.

In FIG. 4, a block diagram is depicted for how safety system 100 can be specifically equipped to interface with autonomous self-driving vehicles. Projector 104a and sensor 104b (the separate components of projector-sensor 104) and/or processing unit 108 may communicate with a camera system 200 or a processing unit of an autonomous vehicle to provide data to facilitate the processing unit of the autonomous vehicle detecting the bicycle and determining an appropriate path around the bicycle. Further, the data may include but not limited to, a speed of the bicycle and the time when the autonomous vehicle breaches the bicycle safety exclusion zone. The sensor and/or processing unit may recognize the autonomous vehicle via specific code system.

One possible way in which processing unit 108 may communicate with an autonomous vehicle is by processing unit 108 instructing projector-sensors 104 to project an indication signal 160, which in turn is recognized by the autonomous vehicle's camera system. Indication signal 160 may be as simple as the presence of a red line of the vehicle safety, exclusion zone 106 projected upon the ground. Alternatively, indication signal 160 may be a more sophisticated projection, such as a flashing light pattern projected in the direction of the autonomous vehicle, or upon the ground in a location capable of being picked up by a camera system on the autonomous vehicle when the vehicle is within a specific range. Preferably, the range is determined such that the autonomous vehicle is able to detect indication signal 160 at a sufficiently safe distance from bicycle 102 so as to allow it to compute an appropriate path around bicycle 102 without risking the cyclist's safety.

The disclosure above encompasses multiple distinct inventions with independent utility. While each of these inventions has been disclosed in a particular form, the specific embodiments disclosed and illustrated above are not to be considered in a limiting sense as numerous variations are possible. The subject matter of the inventions includes all novel and non-obvious combinations and subcombinations of the various elements, features, functions and/or properties disclosed above and inherent to those skilled in the art pertaining to such inventions. Where the disclosure or subsequently filed claims recite "a" element, "a first" element, or any such equivalent term, the disclosure or claims should be understood to incorporate one or more such elements, neither requiring nor excluding two or more such elements.

Applicant(s) reserves the right to submit claims directed to combinations and subcombinations of the disclosed inventions that are believed to be novel and non-obvious. Inventions embodied in other combinations and subcombinations of features, functions, elements and/or properties may be claimed through amendment of those claims or presentation of new claims in the present application or in a related application. Such amended or new claims, whether they are directed to the same invention or a different invention and whether they are different, broader, narrower or equal in scope to the original claims, are to be considered within the subject matter of the inventions described herein.

The invention claimed is:

1. A bicycle safety exclusion zone system of a bicycle, comprising:
   one or more projector-sensor devices configured to detect vehicles in proximity of the bicycle and project a visual safety exclusion zone upon ground surrounding the bicycle; and
   a processing unit in communication with the one or more projector-sensor devices, wherein when one of the projector-sensor devices detects a vehicle in proximity to the bicycle:
   the processing unit generates an alert detectable by a user of the bicycle, and
   the one or more projector-sensor devices change a visual appearance of the visual safety exclusion zone, and
   wherein the projector-sensor devices change the visual appearance of the visual safety exclusion zone when the detected vehicle crosses into a line or touches the line of the visual safety exclusion zone.

2. The bicycle safety exclusion zone system of claim 1, wherein the one or more project-sensor devices are mounted at ends of a handlebar, at a rear of a seat, or a rear of a seat stem.

3. The bicycle safety exclusion zone system of claim 2, wherein the visual safety exclusion zone is defined by a continuous line or a dashed line that encircles the bicycle or an area indicated by diffuse light.

4. The bicycle safety exclusion zone system of claim 3, wherein the one or more projector-sensor devices change the visual appearance of the visual safety exclusion zone by changing the color of the line or changing a pattern of the zone projected upon the ground.

5. The bicycle safety exclusion zone system of claim 1, wherein the alert generated by the processing unit is aural or visual or haptic feedback emitted through a grip, a handlebar, or a seat of the bicycle.

6. The bicycle safety exclusion zone system of claim 1, further comprising a sensor to detect a speed of the vehicle, wherein a scope of the bicycle safety exclusion zone varies with a detected speed.

7. The bicycle safety exclusion zone system of claim 1, wherein the projector-sensor devices include a bulb projector, one or more LED lights, or a laser projector to project the line or a pattern that defines the safety exclusion zone.

8. The bicycle safety exclusion zone system of claim 1, wherein the projector-sensor devices include at least one of a camera or a radar to detect vehicles in proximity to the bicycle by using a camera or a radar.

9. A bicycle safety exclusion zone system, comprising:
   a processing unit;
   at least one sensor in communication with the processing unit; and
   at least one projector in communication with the processing unit, wherein:
   the processing unit, at least one sensor, and at least one projector are all mounted to a bicycle, and
   the processing unit is configured to:
   instruct the at least one projector to generate and project a visual safety exclusion zone upon ground surrounding the bicycle,
   modify an appearance of the visual safety exclusion zone upon the at least one sensor detecting that a vehicle has crossed into the visual safety exclusion zone, and
   alert a driver of the vehicle and people around that the bicycle safety exclusion zone is breached by the driver.

10. The bicycle safety exclusion zone system of claim 9, wherein the processing unit further provides an alert to a user of the bicycle upon the at least one sensor detecting that a vehicle has crossed into the visual safety exclusion zone.

11. The bicycle safety exclusion zone system of claim 9, further comprising a lane detection device to distinguish the vehicle from a parked vehicle or an object on one side of a path that the bicycle is travelling and the alert to a bicycle rider is provided only when the vehicle is detected.

12. The bicycle safety exclusion zone system of claim 11, further comprising a user interface for the user to select an alert option, wherein the alert option includes an alert for a vehicle approaching from the left, an alert for a vehicle approaching from the right, or an alert for a vehicle approaching from either left or right directions.

13. The bicycle safety exclusion zone system of claim 9, wherein the processing unit is further configured to instruct the projector to project an indication signal recognized by a camera system of an autonomous vehicle to assist the autonomous vehicle to detect the bicycle and calculate an appropriate path around the bicycle.

14. The bicycle safety exclusion zone system of claim 13, wherein the indication signal is a red line that defines the bicycle safety exclusion zone or a flashing light pattern on the ground at a location capable of being captured by the camera of the autonomous vehicle when the vehicle approaches the bicycle at a specific distance.

15. A bicycle safety exclusion zone system mounted onto a bicycle, comprising:
   a plurality of projector-sensor devices, wherein:
   each of the plurality of projector-sensor devices is configured to project at least a portion of a visual safety exclusion zone upon ground surrounding the bicycle, the visual safety exclusion zone having a color, and
   each of the plurality of projector-sensor devices is capable of detecting a vehicle approaching the bicycle; and
   a processing unit in communication with the plurality of projector-sensor devices, wherein upon detection of a vehicle by one of the projector-sensor devices:
   the processing unit signals each of the plurality of projector-sensor devices to change the color of the visual safety exclusion zone,
   the processing unit emits a warning to a rider of the bicycle, and wherein:
   the processing unit signals the plurality of projector-sensor devices to change the color of only a portion of the visual safety exclusion zone when the processing unit determines that the detected vehicle has transgressed the visual safety exclusion zone, and
   the portion of the visual safety exclusion zone that is changed comprises a portion that is projected onto the vehicle.

16. The bicycle safety exclusion zone system of claim 15, wherein each of the plurality of projector-sensor devices uses one or more lasers to project its portion of a visual safety exclusion zone.

17. The bicycle safety exclusion zone system of claim 15, wherein the processing unit is in data communication with a smartphone, and the warning is emitted via the smartphone.

18. The bicycle safety exclusion zone system of claim 15, wherein the processing unit signals each of the plurality of projector-sensor devices to change the color of the visual safety exclusion zone when the processing unit determines that a present trajectory of the detected vehicle will carry it into the visual safety exclusion zone.

* * * * *